(12) United States Patent
Yuge et al.

(10) Patent No.: US 8,202,817 B2
(45) Date of Patent: Jun. 19, 2012

(54) NANOCARBON AGGREGATE AND METHOD FOR MANUFACTURING THE SAME

(75) Inventors: Ryota Yuge, Tokyo (JP); Masako Yudasaka, Tokyo (JP); Sumio Iijima, Tokyo (JP)

(73) Assignee: NEC Corporation, Tokyo (JP)

( * ) Notice: Subject to any disclaimer, the term of this patent is extended or adjusted under 35 U.S.C. 154(b) by 84 days.

(21) Appl. No.: 12/523,373

(22) PCT Filed: Jan. 29, 2008

(86) PCT No.: PCT/JP2008/051264
§ 371 (c)(1),
(2), (4) Date: Jul. 16, 2009

(87) PCT Pub. No.: WO2008/093661
PCT Pub. Date: Aug. 7, 2008

(65) Prior Publication Data
US 2010/0075835 A1   Mar. 25, 2010

(30) Foreign Application Priority Data
Jan. 31, 2007   (JP) ................ 2007-022138

(51) Int. Cl.
*B01J 21/18*      (2006.01)
*C01B 31/00*      (2006.01)
*C01B 31/02*      (2006.01)

(52) U.S. Cl. ............... 502/180; 423/445 R; 977/734; 977/738; 977/844; 977/847; 977/878; 977/879

(58) Field of Classification Search ............ 502/180; 423/445 R; 977/734, 738, 844, 847, 878, 977/889
See application file for complete search history.

(56) References Cited

U.S. PATENT DOCUMENTS

| | | | |
|---|---|---|---|
| 7,501,024 B2 * | 3/2009 | Azami et al. | 117/109 |
| 2005/0284296 A1 * | 12/2005 | Iijima et al. | 96/108 |
| 2010/0177462 A1 * | 7/2010 | Adzic et al. | 361/502 |

FOREIGN PATENT DOCUMENTS

| | | | |
|---|---|---|---|
| JP | 2001-064004 | * | 3/2001 |
| JP | 2002-159851 | | 6/2002 |
| JP | 2003-063812 | | 3/2003 |
| JP | 2003-146606 | | 5/2003 |
| JP | 2003-313571 | | 11/2003 |
| JP | 2004-016976 | | 1/2004 |
| JP | 2004-059409 | * | 2/2004 |
| JP | 2004-152489 | | 5/2004 |
| JP | 2005-007241 | | 1/2005 |

(Continued)

OTHER PUBLICATIONS

"Nano-aggregates of single-walled graphitic carbon nano-horns," S. Iijima et al. Chemical Physics Letters 309 (1999), pp. 165-170.*

(Continued)

*Primary Examiner* — Patricia L Hailey
(74) *Attorney, Agent, or Firm* — Young & Thompson

(57) ABSTRACT

A nanocarbon aggregate including a graphite aggregate including a graphene sheet having a petal shape and a nanohorn. The petal-shaped graphite aggregate achieves a reduction in the particulate size and a higher dispersibility by allowing the edge of the petal shape to locally absorb a metal, a metal complex and a metal oxide. The nanocarbon aggregate is used for a catalyst support.

31 Claims, 7 Drawing Sheets

FOREIGN PATENT DOCUMENTS

JP 2005-343885 12/2005

OTHER PUBLICATIONS

International Search Report—PCT/JP2008/051264—Apr. 1, 2008.

Y. Ando et al—Production of peatal-like graphite sheets by hydrogen arc discharge, Carbon, 1997, vol. 35, No. 1, pp. 153-158.

Sanjay K. Srivastava et al.—Growth, structure and field emission characteristics of petal like carbon nano-structured thin films, Thin Solid Films, 2005, vol. 492, pp. 124-130.

Shing-Dar Wang et al.—Unusual morphologies of carbon nanoparticles obtained by arc discharge in deionized water, Carbon, 2005, vol. 43, pp. 1322-1325.

Katsuyuki Murata et al.—Hydrogen production from methane and water at low temperature using EuPt supported on single-wall carbon nanohorns, 2005, pp. 818-820.

T. Yoshitake et al.—Preparation of fine platinum catalyst supported on single-wall carbon nanohorns for fuel cell application—2002, pp. 124-126.

* cited by examiner

NANOCARBON AGGREGATE AND METHOD FOR MANUFACTURING THE SAME

TECHNICAL FIELD

The present invention relates to a nanocarbon aggregate for supporting a catalyst, and a method for manufacturing the same.

BACKGROUND ART

Carbon materials have been used in the form of a catalyst support, an adsorbing agent, a releasing agent, an ink, a toner etc., and attract attention on the structure thereof in recent years due to advent of nanocarbon materials, such as carbon nanotube and carbon nanohorn, having a size of nanometers. The applications thereof have been intensively investigated, as shown in Patent Publication-1 (carbon nanohorn), Patent Publication-2 (DDS), Patent Publication-3 (solid lubricant), Patent Publication-4 (insertion of methane gas), Patent Publication-5 (adsorbing agent), Patent Publication-6 (methane-decomposing catalyst), Patent Publication-7 (catalyst support), and Non-Patent Literature-1.

The unique structure of the carbon nanotube and carbon nanohorn attracts attention as the catalyst support for industrial use, is used recently as a catalyst support for a steam reforming catalyst in a fuel cell or manufacture of hydrogen, and reported as an optimum catalyst support in Patent Publication-7 and Non-patent Literature-1.

It is known in the above applications, for example, that the performance and physical properties of the supported catalyst depends on the mean particulate size, distribution etc. of the supported metal as well as the properties of the support on which the metallic catalyst particulates are supported.

The water solubility, adsorption site, specific surface area, etc. of the support are also the main factors that have a significant influence on the catalyst supporting process and catalyst performance. The catalyst ability basically depends on the specific surface area of the catalyst, which depends on the particulate size. A smaller particulate size increases the specific surface area, thereby improving the catalyst ability. However, since the size of particulates supported on any catalyst support under the present circumstances is about 1.5 to 3.0 nm at the maximum, a further reduction in the particulate size is the most crucial issue in the view point of catalyst efficiency.

It is ordinary for the catalyst to be used after activation or stabilization by anneal etc. thereof succeeding to supporting thereof on the support. However, it is known that the catalyst ability is impaired by aggregation and coarsening of the catalyst, and thus the coarsening of catalyst particulates is also one of the issues.

In addition, it is also known that if the catalyst particulates on the support are likely to move thereon, the coarsening of particulate size occurs during the use thereof due to aggregation of metallic catalyst particulates caused by those processes. This degrades the catalyst characteristic after a long term use thereof, incurring a practical problem on the durability of a battery cell or a steam reforming catalyst.

Patent Publication-1: JP-2002-159851A
Patent Publication-2: JP-2005-343885A
Patent Publication-3: JP-2003-313571A
Patent Publication-4: JP-2004-16976A
Patent Publication-5: JP-2005-7241A
Patent Publication-6: JP-2003-146606A
Patent Publication-7: JP-2004-152489A Non-Patent Literature-1: K. Murata et al. Carbon 44, 799 (2006)

Non-patent literature-2: T. Yoshitake, Y. Shimakawa, S. Kuroshima, H. Kimura, T. Ichihashi, Y. Kubo, D. Kasuya, K. Takahashi, F. Kokai, M. Yudasaka, S. Iijima: Physical 2002, B323, p 124.

SUMMARY OF THE INVENTION

In view of the above, it is an object of the present invention to provide a catalyst-supporting nanocarbon aggregate that is capable of realizing a microparticulation and a higher dispersibility of the structure of the nanocarbon aggregate that supports the catalyst and capable of enabling an efficient catalyst supporting, and to provide a method for manufacturing the same.

The present invention provides a nanocarbon aggregate that includes one or a plurality of layers of graphene sheet and has a petal shape as a whole.

The present invention also provides a method for manufacturing a nanocarbon aggregate including a petal-shaped graphite aggregate and a nanohorn by using $CO_2$ laser ablation, the method including controlling, in the $CO_2$ laser ablation, a scanning rate of laser that scans a surface of a graphite target, intensity of the laser, and species and pressure of an ambient gas, to thereby control a content ratio of the petal-shaped graphite aggregate to the nanohorn.

The present invention further provides a method for manufacturing a nanocarbon aggregate including a petal-shaped graphite aggregate and a nanohorn by using $CO_2$ laser ablation, the method including performing an oxidation treatment on the nanocarbon aggregate obtained after the $CO_2$ laser ablation, to thereby control a content ratio of the petal-shaped graphite aggregate to the nanohorn.

The above and other objects, features and advantages of the present invention will be more apparent from the following description, referring to the accompanying drawings.

DETAILED DESCRIPTION OF THE INVENTION

Figure 1:
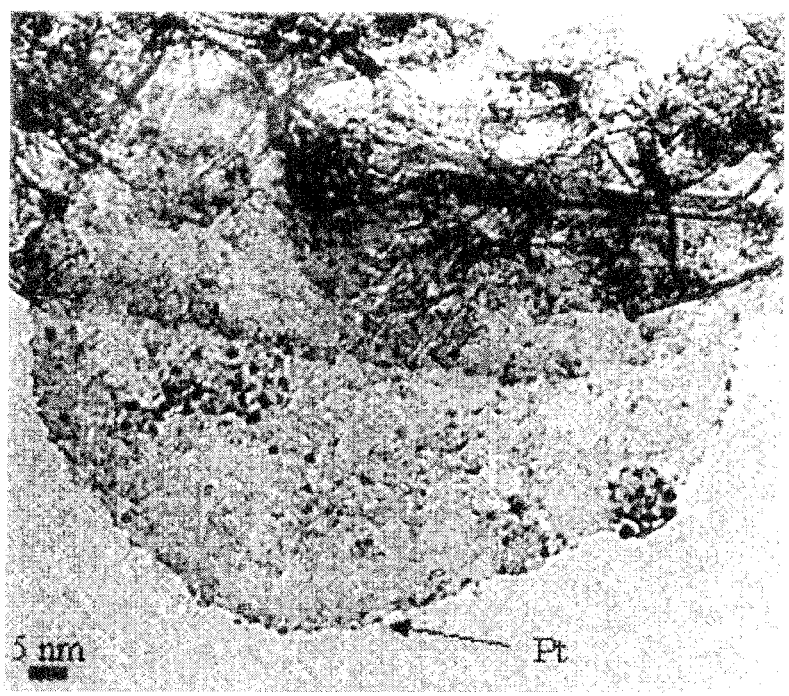
FIG. 1 is an electron micrograph showing that Pt particulates are absorbed onto the edge of a petal-like graphite aggregate in a carbon nanotube aggregate according to an exemplary embodiment of the present invention.

The present invention is directed to a nanocarbon aggregate including a graphite aggregate including one or a plurality of layers of graphene sheet and having a petal shape as a whole.

The present invention is also directed to a method for manufacturing a carbon aggregate including a petal-shaped graphite aggregate and a nanohorn by using $CO_2$ laser ablation, the method including controlling, in the $CO_2$ laser ablation, a scanning rate of laser that scans a surface of a graphite target, intensity of the laser, and species and pressure of an ambient gas, to thereby control a content ratio of the petal-shaped graphite aggregate to the nanohorn.

The present invention is further directed to a method for manufacturing a carbon aggregate including a petal-shaped graphite aggregate and a nanohorn by using $CO_2$ laser ablation, the method including performing an oxidation treatment on the nanocarbon aggregate obtained after the $CO_2$ laser ablation, to thereby control a content ratio of the petal-shaped graphite aggregate to the nanohorn.

A preferred embodiment of the nanocarbon aggregate according to the present invention has a configuration wherein a metal, a metal complex and a metal oxide is locally absorbed as nanometer-order sized particulates onto an edge of the nanocarbon having a graphene sheet structure. Here, in the present invention, the graphene sheet structure is defined by a structure of single-atomic-layer sheet-like graphite (graphene sheet) wherein carbon atoms are bonded together substantially on a plane in the shape of hexagon, or a structure wherein a plurality of graphene sheets are stacked one on another. The particulate size of the particulates such as a catalyst absorbed onto this graphene sheet is smaller than usual due to the thickness of the graphene sheet and effect of the surface functional group, thereby achieving microparticulation of the catalyst particulates.

The feature of the preferred embodiment includes an oxidation treatment of the graphene sheet structure, thereby allowing the edge to absorb thereon the surface functional group and stabilizing the particulates of catalyst etc. to enable a higher dispersibility thereof. By performing this treatment, the catalyst particulates can be stably fixed onto the edge of graphite, thereby suppressing coarsening of the catalyst during the anneal or use of the catalyst.

It is possible to use one or a plurality of layers of graphene sheet (petal-shaped graphite aggregate) as the nanocarbon having the graphene sheet structure. In the present invention, the petal is of a structure wherein 20 or a less number of layers, for example, 1 to 10 layers of the graphene sheet are stacked one on another to form a structure having a longitudinal/lateral size of 300 nm or smaller, for example, around 30 to 200 nm.

In the nanocarbon aggregate including the petal-shaped graphite aggregate, further possession of a plurality of nanohorns supported on the petal-shaped graphite configures a nanocarbon composite (referred to as petal-containing carbon nanohorn composite, hereinafter). The content ratio of the petal to the nanohorn in the petal-containing carbon nanohorn aggregate can assume an arbitrary value. In addition, the nanohorn has a structure of dahlia type, bud type or seed type or an intermediate structure between those types. In this case, the content ratio of the petal may be between 1% and 100% inclusive of both In the petal-containing nanocarbon aggregate including the petal-shaped graphite aggregate, the content ratio of the petal to the nanohorn can be controlled, during the manufacture using a $CO_2$ laser ablation technique, based on the scanning rate of laser scanning on the surface of a graphite target, intensity of laser, and species and pressure of the ambient gas.

The density of laser power applied to the target is proportional to the kinetic energy of carbon upon evaporation, and accordingly a lower density of the laser power reduces the cooling rate upon the growth of carbon, thereby achieving a sufficient formation of graphite and increasing the petal structure.

As to the content ratio of the petal to the nanohorn in the above petal-shaped graphite aggregate, the content ratio of petal may be increased by taking advantage of the fact that the nanohorn has a larger number of deficiencies and thus is burnt up on a priority basis after the petal-shaped graphite aggregate is subjected to an oxidation treatment (heating in oxygen, heating in nitric acid or heating in hydrogen peroxide). Use of this manufacturing process may manufacture a nanocarbon aggregate having only the petal structure.

The edge of the petal of the petal-shaped graphite aggregate is easy to configure a reaction site, may be easily oxidized (by heating in oxygen, heating in nitric acid, heating in hydrogen peroxide etc.), and can be added with a substitution group, such as carbonyl group, carboxyl group, lactone group, hydroxyl group, and an anhydride.

An opening may be formed by performing an oxidation treatment (heating in oxygen, heating in nitric acid, heating in hydrogen peroxide etc.) of the nanohorn deficiencies etc., in addition to the edge of the above petal, in the petal-shaped graphite aggregate. By oxidation of both the edge of opening and the edge of petal, a substituent group such as carbonyl group, carboxyl group and a hydroxyl group can also be added.

In addition, the substituent group such as carbonyl group, carboxyl group, lactone group, hydroxyl group, and anhydride in the petal-shaped graphite aggregate wherein the above edge is provided with the substituent group may be further chemically modified.

In the present invention, bovine serum albumin (BSA), 1-polyethylene glycol (PEG), 1,4-diaminobutane, spermine, 1,1,4,7,10,10-hexa-methyltriethylenetetramine, 1,4,8,11-tetramethyl-1,4,8,11-tetraazacyclotetradecane, butylamine, glycine, folic acid etc. can be used as those to be chemically modified.

The substituent group such as carbonyl group, carboxyl group, lactone group, hydroxyl group, an anhydride in the petal-shaped graphite aggregate wherein the substituent group is provided on the edge portion may be added with a metallic compound etc. to obtain catalyst particulates having a higher activity and a higher endurance. Here, the metallic compound may be a mixture or compound of one or a plurality of species of a metal, a metallic complex and a metal oxide.

In addition, if the above metallic compound is a mixture of a plurality of species, the mixing ratio of the support material may be controlled to have an arbitrary content ratio.

Further, the substituent group such as a carbonyl group, carboxyl group, a lactone group, a hydroxyl group, an anhydride in the petal-shaped graphite aggregate, wherein the substituent group is provided on the above edge, may be added with an organic matter or biologic molecule other than a metallic compound. In this way, an additional characteristic such as a solvent dispersibility and biographic affinity can be added. Derivatives of tetrathiafulvalen (TTF), tetracyanoquinodimethane (TCNQ) etc. are exemplified as the organic matter, and dexamethasone (DEX), doxorubicin (DRX) etc. are exemplified as the biologic molecules.

Upon introduction of the metallic compound, organic matter or biologic molecule onto the edge portion added with the substituent group, the amount of introduction can be controlled by controlling the atmosphere (gaseous phase, liquid phase) and conditions (solvent, pH, temperature etc.).

As described heretofore, modification of the edge portion of the petal-shaped graphite aggregate can provide a carbon material having a higher function.

The present invention will be further described in detail hereinafter with reference to the drawings. FIG. 1 shows an electron micrograph showing the structure manufactured by a method according to an example of the present invention. In FIG. 1, a black dot (indicated by an arrow in the figure) represents Pt, which is locally absorbed onto an edge of the graphene sheet structure, as understood in the figure. The size thereof is 0.2 to 1.5 nm.

With reference to FIG. 1, the nanocarbon complex, wherein catalyst particulates are supported with a higher dispersibility onto the edge of the graphene sheet structure, has a structure wherein minute particulates having mostly a size of 1 nm or smaller are locally supported on the edge and dispersed uniformly.

Figure 2:
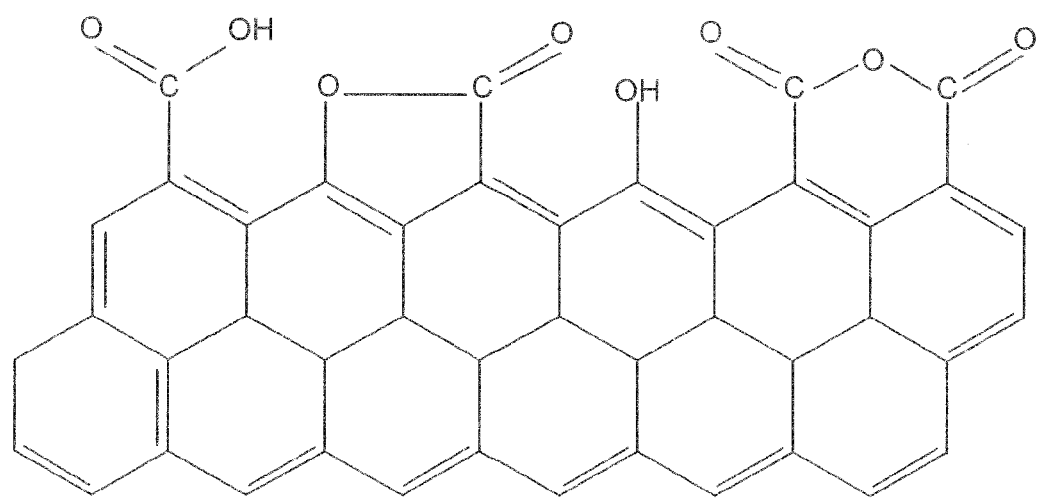
FIG. 2 is a conceptual diagram of the graphite aggregate wherein the edge portion is replaced by a hydrophilic group in an oxidation treatment.

The graphene sheet shown in FIG. 1 can be replaced, while using an oxidation treatment, by a surface functional group including therein a hydrophilic group at the edge. The replacement is performed using oxygen or air in the gaseous phase, or using hydrogen peroxide, nitric acid, and sulfuric acid in the liquid phase. As a result, the structure shown in FIG. 2 is obtained. In this case, it is suitable that the replacement is performed at a temperature between 350° C. and 600° C. in the case of gaseous phase. In the case of liquid phase, it is suitable to perform the replacement for 1 to 12 hours at 100° C. in the hydrogen peroxide, and for 1 to 20 minutes at 100° C. in the sulfuric acid or nitric acid. The surface functional group can be removed at 800 to 1200° C. in an inactive gas ambient or hydrogen gas ambient. Thus, in the case of absence of the surface functional group, absorption to the edge is also possible.

The edge of the graphene sheet structure replaced by the hydrophilic group is allowed to locally absorb a metal, metal complex, metal oxide etc., whereby the absorbed substance is highly dispersed and fixed thereto. In this case, Au, Pt, Pd, Ag, Cu, Fe, Ru, Ni, Sn, Co, or a lanthanoid element or a metal complex or oxide of those is effective, and absorbed onto the surface functional group on a priority basis and fixed thereto. The supporting techniques to be used in this case include a colloid technique reported in Non-Patent Literature-2, and an impregnation technique wherein a solution containing a catalyst metal and the petal-containing carbon nanohorn are mixed together, dispersed and agitated, followed by collection using a filter. As the solution including the catalyst metal, hexa-ammineplatinum oxalate solution or hexa-chloroplatinum solution may be used in this case.

The petal-containing carbon nanohorn used as the starting material may be synthetically prepared by controlling the irradiation density of laser and rotational speed of the target under the synthetic condition of $CO_2$ laser ablation. An inactive gas ambient such as Ar and around a room temperature may be used as the atmosphere of this synthesis. In this case, the laser power density is changed between 10 kW/cm$^2$ and 50 kW/cm$^2$, and the rotational speed of the target is controlled between 0.5 rpm and 6 rpm, to thereby separately manufacture petal type (petal-containing carbon nanohorn), dahlia type, bud type, or seed type of the carbon nanohorn. The petal-containing carbon nanohorn manufactured includes one to ten layers of the graphene sheet, and has an agglomerated structure of 30 to 200 nm. It also has a structure including a nanohorn having a diameter of 2 to 5 nm.

From the above petal-type carbon nanohorn, a nanocarbon complex having only a petal structure can be manufactured by controlling conditions of the oxidation treatment. As for the conditions of the manufacture, a heat treatment may be performed in an oxygen ambient, for the case of gaseous phase, at 550 to 650° C. for 5 to 15 minutes, or an oxidation treatment may be performed in a hydrogen peroxide, for the case of liquid phase, at 60 to 100° C. for 4 to 12 hours. For the case of liquid phase reaction, additional optical irradiation, if used, is more effective.

The substance to be supported onto the edge of the graphene sheet structure may be a metal, such as Au, Pt, Pd, Ag, Cu, Fe, Ru, Ni, Sn, Co, or an lanthanoid element, or a metal complex or a metal oxide thereof as alone, or a mixture of two or more of them, or a compound thereof, as described before.

If the substance to be supported onto the edge of the graphene sheet structure is a mixture of two or more materials, control of the mixing ratio of the support material provides an arbitrary composition for the manufactured nanocarbon composite, and enables alloying etc. thereof if a heat treatment is additionally performed. The heat treatment as described herein may be performed in an inactive gas ambient, such as using Ar, or a vacuum ambient at 100 to 1200° C. In an alternative, a reducing ambient such as using hydrogen may also be used for reduction.

The amount of the supported may be controlled by adjusting the atmosphere (gaseous phase, liquid phase) and conditions (solvent, pH, temperature etc.) upon the supporting onto the edge of the graphene sheet structure.

EXAMPLES

Examples will be described hereinafter, for exemplifying and describing the present invention in more detail. However, the present invention is not limited to the following examples.

Example-1

Figure 3:
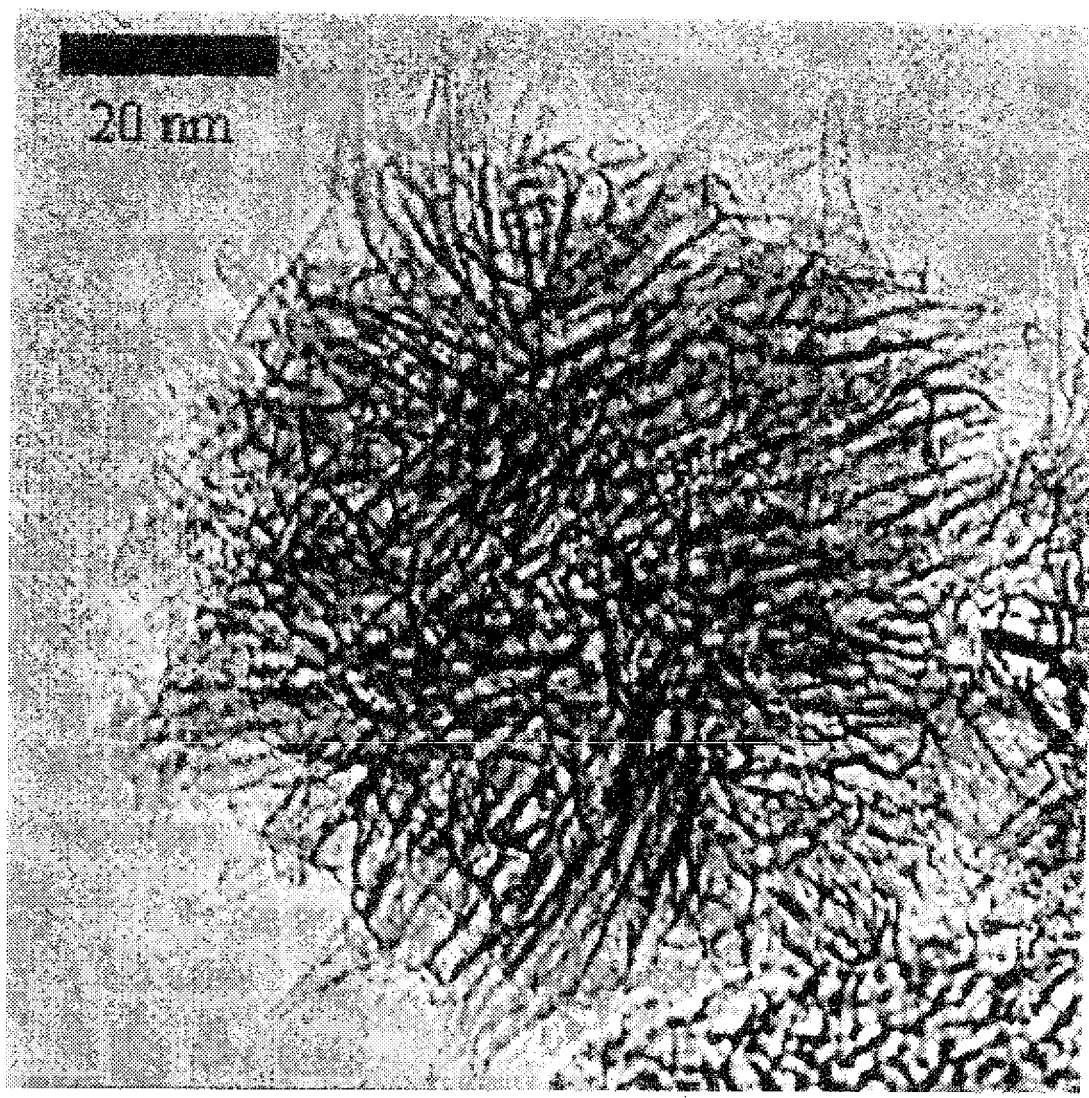
FIG. 3 is an electron micrograph of a dahlia-type petal-containing carbon nanohorn.
Figure 4:
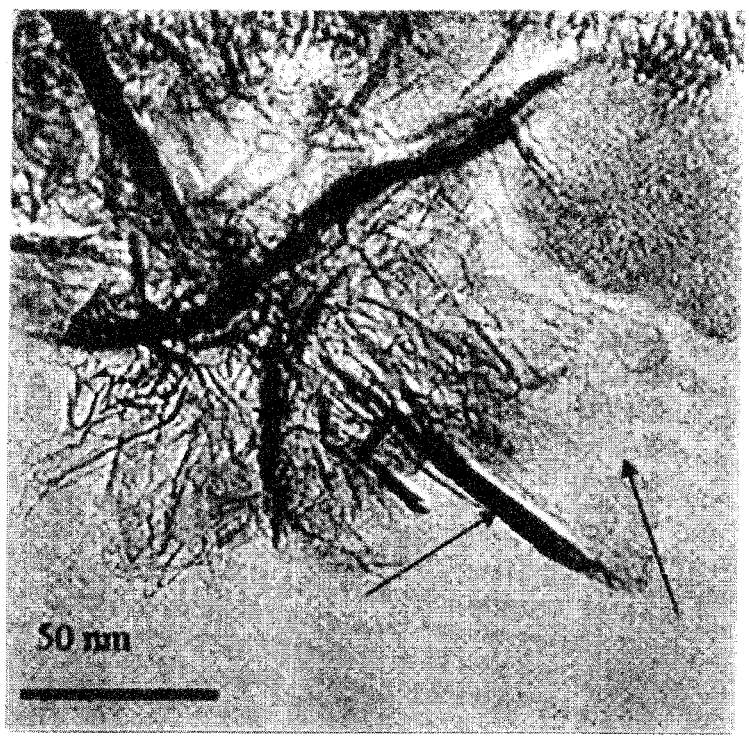
FIG. 4 is an electron micrograph of a petal-containing carbon nanohorn aggregate including a petal-shaped graphite aggregate and a nanohorn.
Figure 5:
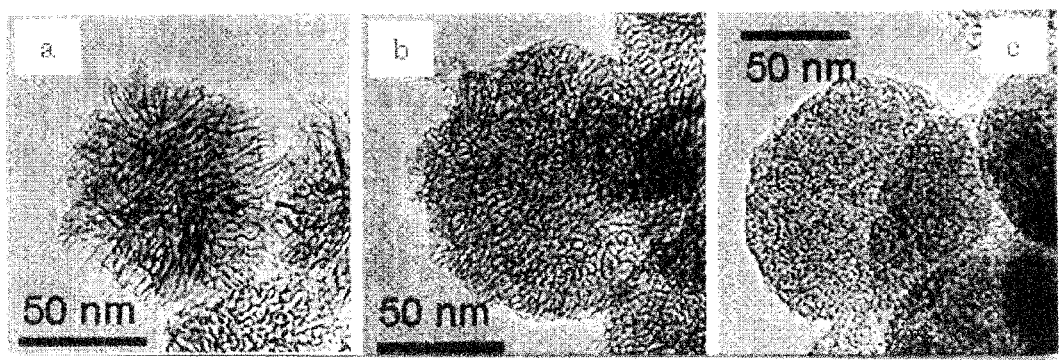
FIG. 5 is an electron micrograph of a petal-containing carbon nanohorn of a dahlia type (a), a bud type (b), and a seed type (c).

In Example-1, manufacture of the carbon nanohorn aggregate including a petal-type graphite aggregate and a nanohorn will be described. By controlling the power density of laser (15, 30, 45 kW/cm$^2$) and rotational speed of the target (1-6 rpm) while using the $CO_2$ laser ablation process, the petal-type carbon nanohorn shown in FIG. 4 as well as the conventional carbon nanohorn shown in FIG. 3 was synthetically manufactured. In the thus obtained typical petal-type carbon nanohorn, the portion indicated by an arrow is the graphene sheet structure, wherein the left arrow in FIG. 4 indicates the graphene sheet observed in the perpendicular direction, and the right arrow in FIG. 4 indicates the same observed in the in-plane direction. The following is the detail of experiments. The output of $CO_2$ laser is continuously irradiated at 3.5 kW, and the synthesizing atmosphere was at the room temperature and an Ar ambient. The laser power density is controlled, by changing the position of a ZeSe lens that focuses the laser to thereby change the focal position with respect to the graphite target. A large-sized graphite target was used having a diameter of 100 mm and a total length of 500 mm (whereby the effective irradiation length was 435 mm). As the result of the experiments, a dahlia-type, a bud type, and a seed-type carbon nanohorns as well as the petal-containing carbon nanohorn were manufactured, as shown in FIG. 5.

Figure 6:
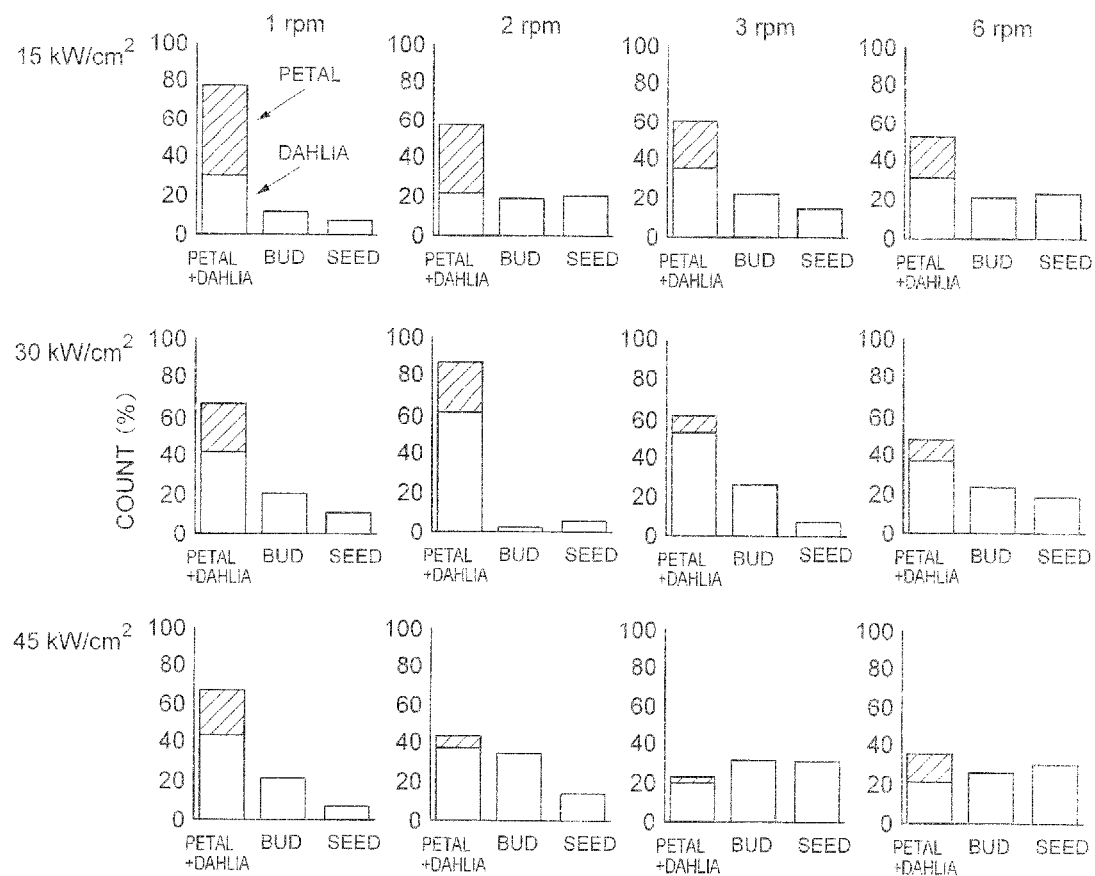
FIG. 6 is a distribution diagram showing each of the petal type, dahlia type, bud type and seed type nanohorns obtained by an electron micrograph of the petal-containing carbon nanohorn aggregate.

Each of the carbon nanohorns manufactured by the respective synthesizing conditions was observed by an electron microscope, and the number of carbon nanohorns observed and belonging to the respective four types was enumerated. The result is shown in FIG. 6. In this enumeration, that which included the nanohorn (2- to 5-nm sheath structure) in the petal structure is enumerated as the petal structure. It is understood from this result that control of the synthesizing conditions can provide different carbon nanohorns thus manufactured. For the petal structure, the quantity of petal included therein assumes a maximum at a laser power density of 15 kW/cm$^2$ and a rotational speed of the target at 1 rpm. This reveals that the optimum rotational speed of the target is in the range of around 0.5 to 2 rpm for the range of power density between 10 kW/cm$^2$ and 15 kW/cm$^2$, which is the minimum range that can evaporate the target.

Example-2

Figure 7:
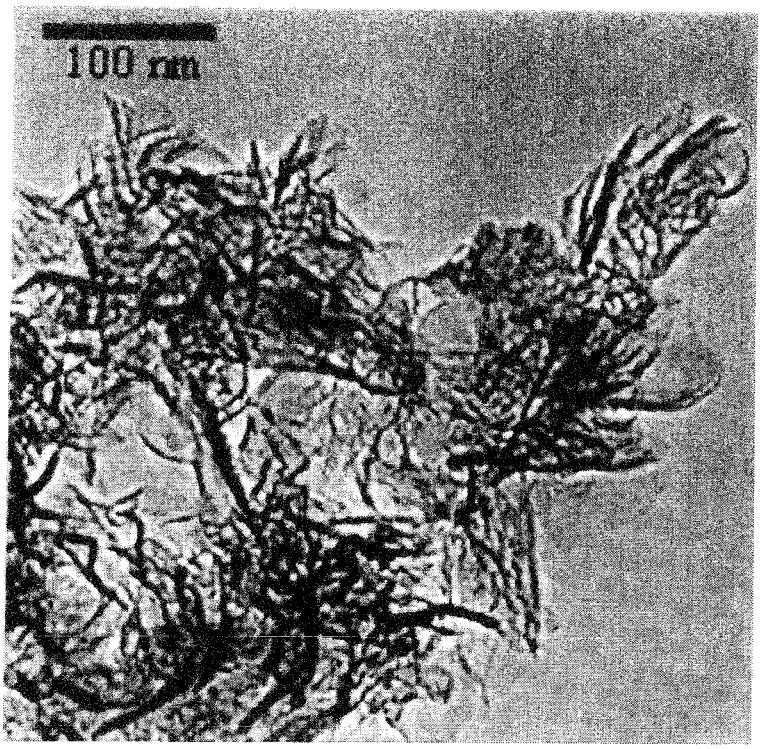
FIG. 7 is an electron micrograph of a nanocarbon aggregate including only the petal structure and manufactured by an oxidation treatment of the petal-containing carbon nanohorn.

In Example-2, oxidation treatment of the petal-containing carbon nanohorn will be described. As shown in FIG. 4, the petal-containing carbon nanohorn (40 mg) was dispersed in a 100-ml hydrogen peroxide solution, to perform the oxidation treatment at 100° C. for 6 hours. The resultant structure was cleaned by removing therefrom the hydrogen peroxide by using a filter, and dried in a vacuum. FIG. 7 shows an electron micrograph of the sample thus obtained. As a result of moderate oxidation using the hydrogen peroxide, as understood from FIG. 7, the entire carbon nanohorn structure was oxidized and disappeared, to leave only the petal structure.

Figure 8:
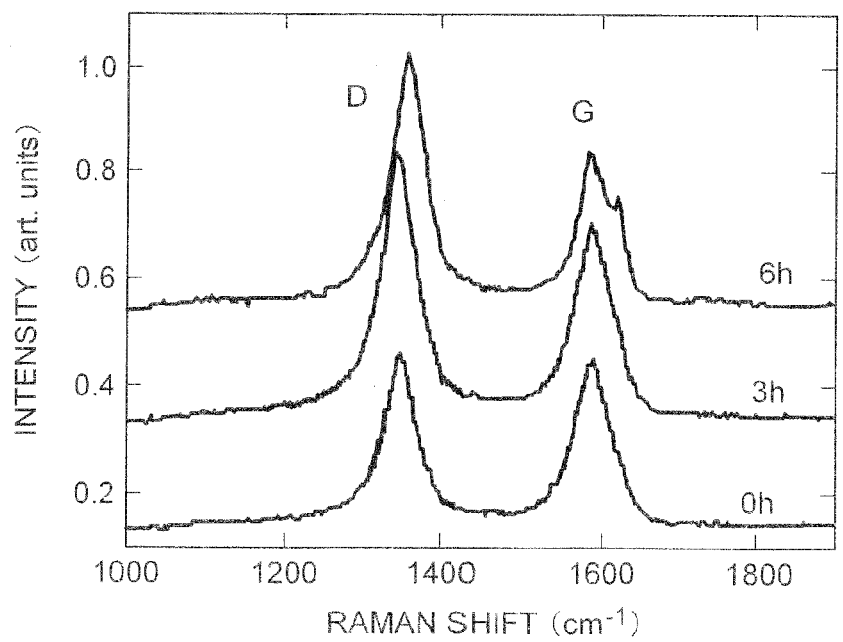
FIG. 8 is a diagram showing results of comparing, using a Raman measurement, the petal-containing carbon nanohorn manufactured by the present invention against the same after oxidation thereof.

FIG. 8 shows the result of comparison using a Raman measurement between the untreated carbon nanohorn aggregate (15 kW/cm$^2$, 2 rpm) and the oxidation-treated carbon nanohorn aggregate (oxidation treatment time of 3 and 6 hours at 100° C.). In the sample treated at 100° C. for 6 hours, it is assured that a new peak appears on the higher wavenumber side of G-band in the vicinity of 1600 cm$^{-1}$, thereby revealing that the D-band is conspicuously shifted toward the higher wavenumber side. This means that the oxidation treatment largely changed the structure of the petal-containing carbon nanohorn aggregate, thereby ensuring, similarly to the result of electron microscope, that a new carbon nanohorn aggregate, most part of which is occupied by the petal structure, was formed.

Example-3

In Example-3, support of the Pt catalyst onto the edge of graphene sheet will be described. The petal-containing nanohorn aggregate (petal-containing carbon nanohorn treated in hydrogen peroxide at 100° C. for 6 hours), which was obtained by the above treatment, was dispersed in a hexaammineplatinum oxalate ethanol solution, and agitated at the room temperature for 12 hours. Thereafter, the resultant structure was filtered using a filter. Subsequently, a 24-hour vacuum drying was performed, to evaporate the solvent contained therein for a complete removal thereof. Thereafter, reduction was performed in a hydrogen ambient at 300° C. for 2 hours. FIG. 1 shows a transmission electron micrograph of those samples. In FIG. 1, a black dot (indicated by an arrow in the figure) represents Pt, which was recognized to be locally absorbed onto the edge of the graphene sheet structure. The size thereof ranged from 0.2 to 1.5 nm, and the average size was 1 nm or less, whereby it is understood that the size is smaller than the particulate size of the conventional Pt catalyst.

Figure 9:
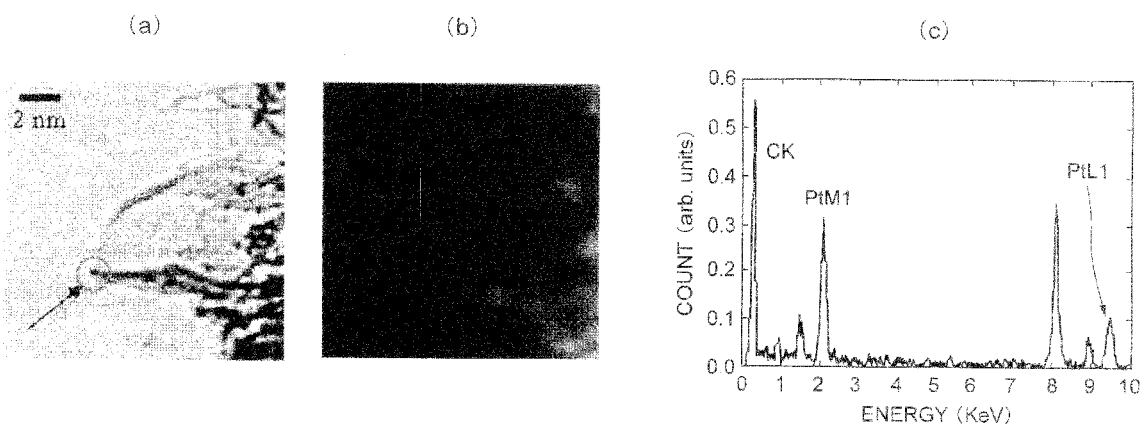
FIG. 9 is a scanning transmission electron micrograph (a), a Z-contrast picture (b) and a result of energy dispersive X-ray spectroscopy (c) of Pt absorbed onto the edge of the graphene sheet manufactured according to the present invention.

FIGS. 9(*a*), 9(*b*) and 9(*c*) show a scanning transmission electron micrograph (STEM) of the Pt absorbed onto the edge of the graphene sheet, a Z-contrast photograph, and the result of energy dispersive X-ray spectroscopy (EDS), respectively. After analyzing a portion indicated by the arrow in the STEM photograph by using the EDS, it was assured that the black dot was Pt. It was estimated by a thermo gravimetric analysis in an oxygen ambient that the Pt was around 15% by weight ratio with respect to the petal-containing carbon nanohorn (carbon aggregate including only the petal structure) that had been subjected to the oxidation treatment. Pt was also supported onto the conventional carbon nanohorn in a similar way, and used as a comparative sample.

Example-4

In Example-4, evaluation of the catalyst characteristic will be described. The catalyst activity of Pt catalyst supported onto the edge of the graphene sheet as manufactured above was evaluated based on an oxygen reduction reaction that is an electrochemical technique. Measurement was performed by a typical 3-electrode cell using a rotating electrode. Catalyst powder was mounted on the rotating electrode configuring a working electrode, and a 0.2-μml Nafion (registered trademark) solution was added thereto to fix the sample onto the electrode. Ag/AgCl was used as the reference electrode, and platinum was used as the counter electrode. The electrolyte solution was adjusted at 0.5 M-$H_2SO_4$.

Figure 10:
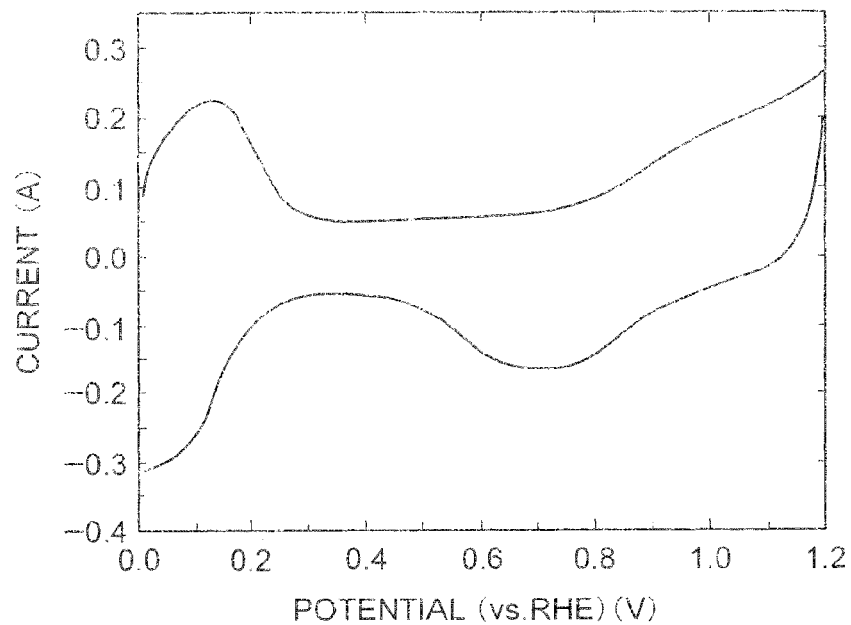
FIG. 10 is a diagram showing the results of measurement of Pt absorbed onto the edge of the graphene sheet manufactured according to the present invention, using cyclic voltammetry in a 0.5-ml sulfuric acid.
Figure 11:
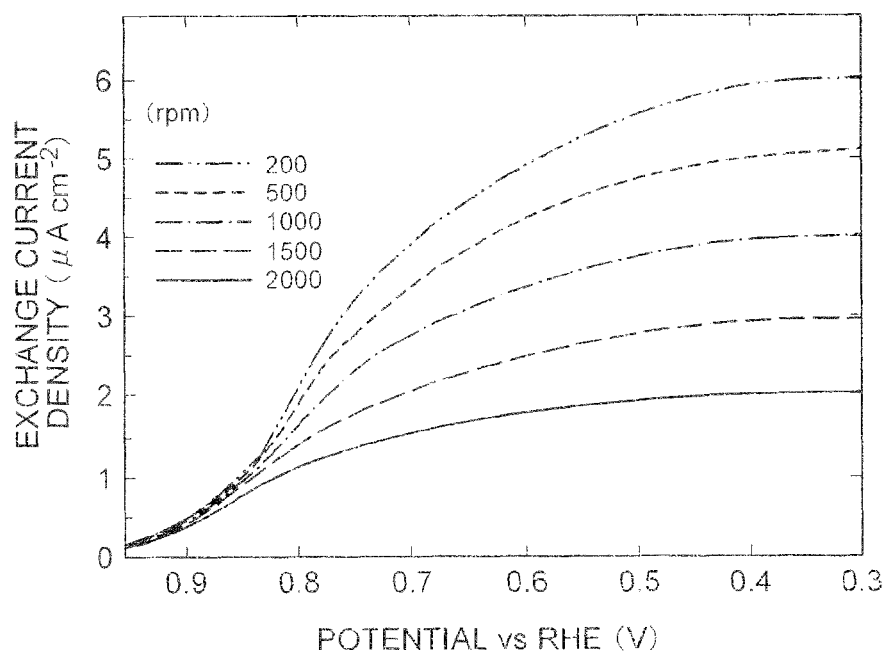
FIG. 11 is a current-voltage characteristic diagram showing the oxygen reduction reaction of Pt absorbed onto the edge of the graphene sheet manufactured according to the present invention.

FIG. 10 shows a cyclic voltammetry of the carbon aggregate catalyst including only the petal structure wherein the Pt was absorbed onto the edge of the graphene sheet. The effective surface area of Pt was calculated from the hydrogen-adsorption-desorption wave in the area of 0 to 0.3V. As a result, the average particulate size was calculated at 0.9 nm. FIG. 11 shows, as a current-voltage characteristic, an oxygen reduction reaction in an oxygen-saturated ambient while changing the rotational speed of the rotating electrode. The result is such that the exchange current density assumed 1.0× 10$^{-9}$ A/cm$^2$, and the Tafel gradient assumed 125 mV/dec. For a comparison purpose, a Pt-supported catalyst was manufactured using the conventional carbon nanohorn, and was subjected to a similar experiment. The Pt size was 3 nm, exchange current density assumed 1.0×10$^{-9}$ A/cm$^2$, and Tafel gradient assumed 130 mV/dec. This means that the Pt particulates absorbed onto the edge had a catalyst activity per surface area that is similar to that of the ordinary 3-nm Pt particulates, and thus it was confirmed that the catalyst performance is not changed by the microparticulation. This fact shows that the activity per weight of Pt increases, whereby a higher catalyst performance can be achieved by a smaller amount of the catalyst. These two types of catalyst were compared against each other after a long term storage thereof at 400° C. in a vacuum, revealing that the Pt catalyst supported onto the untreated carbon nanohorn had a tendency of gradually aggregating after 100 hours had elapsed. On the other hand, it was confirmed by a SEM observation that the catalyst wherein the Pt was locally supported with a higher dispersibility onto the edge of the graphene sheet experienced little change in the size thereof after 1,000 hours or more had elapsed.

Example-5

In Example-5, a solvent dispersibility and a biologic affinity will be described. The petal-containing carbon nanohorn (40 mg) was dispersed in a 100-ml hydrogen peroxide solution, and an oxidation treatment was performed at 100° C. for 6 hours. Thereafter, cleaning was performed using a filter to sufficiently remove the hydrogen peroxide, followed by drying in a vacuum. Subsequently, the sample thus obtained is subjected to a thermo gravimetric analysis in He. The temperature range used was from the room temperature to 600° C., wherein the temperature rising rate was 5° C./min. As a result, a weight reduction was observed in the vicinity of 400° C., and it was confirmed from this result that the surface functional group such as carboxyl group is absorbed at 10%. In addition, measurement of this sample by using a light scattering technique revealed that the particulate size of the oxidation-treated petal-containing carbon nanohorn was 50 to 90 nm, assuring a somewhat smaller size compared to the 80 to 120 nm of the conventional carbon nanohorn. Further, improvement of the solvent affinity and biologic affinity was examined by addition of polyethylene glycol (PEG) etc. thereto, and subsequent dispersion into a phosphoric acid physiological buffered salt (PBS) solution. The result was such that the carbon nanohorn aggregate that had not been subjected to the above treatment was aggregated and precipitated, and that the carbon nanohorn aggregate that had been subjected to the above treatment revealed an improvement in the hydrophilic property thereof, and was observed to be not precipitated after 24 hours elapsed.

As described heretofore, according to the nanocarbon aggregate of an embodiment of the present invention, due to local addition of a metal, a metal complex, and a metal oxide to the edge of a nanocarbon having a graphene sheet structure, a catalyst of a higher reactivity which is capable of supporting nanometer-sized catalyst particulates with a higher dispersibility can be manufactured. In addition, due to being supported onto the edge of the graphene sheet, the problem of aggregation and coarsening during a long term use thereof can be solved, whereby it is optimum as the catalyst support for steam reforming in a fuel cell or of methane etc.

In another embodiment of the nanocarbon aggregate of the present invention, the petal-containing nanohorn aggregate has an arbitrary content ratio of the petal to nanohorn, and the nanohorn has a dahlia type, a bud type, a seed type, or an intermediate structure among those types.

In another embodiment of the nanocarbon aggregate of the present invention, only an edge of the petal in the petal-shaped graphite aggregate is oxidized and added with a substituent group such as carbonyl group, carboxyl group, hydroxyl group etc. In this case, the oxidation of the edge may include any of heating in oxygen, heating in nitric acid and heating in hydrogen peroxide.

In another embodiment of the nanocarbon aggregate of the carbon aggregate of the present invention, the nanohorns in the petal-shaped graphite aggregate are oxidized to form an opening therein, and an edge of the opening and the edge of the petal are oxidized and added with a substituent group such as carbonyl group, carboxyl group and hydroxyl group.

The oxidation of the nanohorns in the petal-shaped graphite aggregate may include any of steps of heating in oxygen, heating in nitric acid, and heating in hydrogen peroxide. The configuration of the substituent group differs depending on the species of oxidation process.

In another embodiment of the nanocarbon aggregate of the present invention, the substituent group such as carbonyl group, carboxyl group and hydroxyl group is chemically modified.

In another embodiment of the nanocarbon aggregate of the present invention, the substituent group such as carbonyl group, carboxyl group and hydroxyl group is added with a metallic compound.

In another embodiment of the nanocarbon aggregate of the present invention, the substituent group such as carbonyl group, carboxyl group and hydroxyl group is added with an organic matter, a biologic molecule etc., whereby an additional characteristic such as a solvent dispersibility and a biologic side wall is provided thereto.

In an embodiment of the method for manufacturing a nanocarbon aggregate according to the present invention, during $CO_2$ laser ablation for manufacturing the petal-shaped graphite aggregate, a scanning rate of laser that scans a surface of a graphite target, intensity of the laser, and species and pressure of an ambient gas are controlled to control the content ratio of the petal to the nanohorn.

In another embodiment of the method of the present invention, the process includes the steps of oxidizing only the edge of the petal in the petal-shaped graphite aggregate, and adding a substitution group, such as a carbonyl group, a carboxyl group, and a hydroxyl group.

In another embodiment of the method of the present invention, the oxidation of only the edge of the petal includes heating in oxygen, heating in nitric acid, or heating in hydrogen peroxide etc.

In another embodiment of the method of the present invention, the process includes the steps of oxidizing the nanohorn in the petal-containing carbon nanohorn aggregate to form therein an opening, and oxidizing the edge of the opening and edge of the petal to add a substituent group such as carbonyl group, carboxyl group and hydroxyl group.

In another embodiment of the method of the present invention, the step of oxidizing the nanohorn includes heating in oxygen, heating in nitric acid, or heating in hydrogen peroxide.

In another embodiment of the method of the present invention, the process includes the step of chemically modifying the substituent group such as carbonyl group, carboxyl group and hydroxyl group.

In another embodiment of the method of the present invention, the process includes the step of adding a metallic compound to the substituent group such as carbonyl group, carboxyl group and hydroxyl group in the petal-shaped graphite aggregate.

In another embodiment of the method of the present invention method, the process includes the steps of adding an organic matter or biologic molecule to the substituent group such as carbonyl group, carboxyl group and hydroxyl group, and providing an additional characteristic such as solvent dispersibility and biographic side wall.

In another embodiment of the method of the present invention, the process includes the step of oxidation-treating the petal-shaped graphite aggregate, to increase the content ratio of petal by taking advantage of burning the nanohorn on a priority basis.

In another embodiment of the method of the present invention, by locally supporting a metallic compound etc. on the edge of the graphene sheet structure, the petal-containing carbon nanohorn aggregate is added with a solvent affinity and biologic affinity while using a technique similar to the technique of enabling the microparticulation and higher dispersibility.

While the invention has been particularly shown and described as above with reference to exemplary embodiment thereof, the invention is not limited to these embodiments and modifications. As will be apparent to those of ordinary skill in the art, various changes may be made in the invention without departing from the spirit and scope of the invention as defined in the appended claims.

This application is based upon and claims the benefit of priority from Japanese patent application No. 2007-022138 filed on Jan. 31, 2007, the disclosure of which is incorporated herein in its entirety by reference.

Industrial Applicability

The nanocarbon aggregate of the present invention can be applied to a catalyst support, adsorbing agent, a releasing agent, an ink, a toner etc. that are applications as the carbon material, and in particular, can be applied to a catalyst-supporting carbon nanohorn aggregate that enables microparticulation and higher dispersibility of the catalyst manufactured from the carbon material.

The invention claimed is:

1. A nanocarbon aggregate comprising:
a graphite aggregate including one or a plurality of graphene sheets and having a petal shape as a whole; and
a plurality of nanohorns supported on said petal-shaped graphite aggregate.

2. The nanocarbon aggregate according to claim 1, wherein said nanohorns have a dahlia shape, a bud shape, a seed shape, or an intermediate shape among those shapes.

3. The nanocarbon aggregate according to claim 1, wherein an edge of said petal-shaped graphite aggregate is oxidized and added with at least one substituent group including at least one of carbonyl group, carboxyl group and hydroxyl group.

4. The nanocarbon aggregate according to claim 3, wherein said oxidization of said edge of said petal-shaped graphite aggregate is performed by at least one of heating in oxygen, heating in nitric acid, and heating in hydrogen peroxide.

5. The nanocarbon aggregate according to claim 3, wherein said substituent group is chemically modified.

6. The nanocarbon aggregate according to claim 3, wherein said substituent group added with a metallic compound.

7. A catalyst comprising the nanocarbon aggregate according to claim 6.

8. The nanocarbon aggregate according to claim 3, wherein said substituent group is added with an organic matter or a biologic molecule.

9. The nanocarbon aggregate according to claim 1, wherein at least some of said nanohorns are oxidized to form an opening therein, and an edge of said opening is oxidized and added with at least one substituent group including at least one of carbonyl group, carboxyl group and hydroxyl group.

10. The nanocarbon aggregate according to claim 9, wherein said oxidation of said at least some of said nanohorns is performed by at least one of heating in oxygen, heating in nitric acid, and heating in hydrogen peroxide.

11. A method for manufacturing a nanocarbon aggregate including a petal-shaped graphite aggregate and a nanohorn by $CO_2$ laser ablation, said method comprising:
controlling, in the $CO_2$ laser ablation, a scanning rate of a laser that scans a surface of a graphite target, intensity of the laser, and species and pressure of an ambient gas, to thereby control a content ratio of the petal-shaped graphite aggregate to the nanohorn, wherein a laser power density is changed between 10 and 50 kW/cm$^2$.

12. The method for manufacturing a nanocarbon aggregate according to claim 11, wherein said oxidation treatment includes at least one of heating in oxygen, heating in nitric acid, and heating in hydrogen peroxide.

13. The method for manufacturing a nanocarbon aggregate according to claim 11, further comprising oxidizing an edge of the petal-shaped graphite aggregate, and adding at least one substituent group including at least one of carbonyl group, carboxyl group and hydroxyl group.

14. The method for manufacturing a nanocarbon aggregate according to claim 13, wherein the oxidization of the edge of the petal-shaped graphite aggregate includes at least one of heating in oxygen ambient, heating in a nitric acid ambient, and a heating in a hydrogen peroxide ambient.

15. The method for manufacturing a nanocarbon aggregate according to claim 13, further comprising oxidizing the nanohorn in the nanocarbon aggregate to form therein an opening, and oxidizing an edge of the opening to add thereto at least one substituent group including at least one of carbonyl group, carboxyl group and hydroxyl group.

16. The method for manufacturing a nanocarbon aggregate according to claim 15, wherein said oxidization of the nanohorn includes at least one of heating in oxygen, heating in nitric acid, and heating in hydrogen peroxide.

17. The method for manufacturing a nanocarbon aggregate according to claim 13, wherein said substituent group is chemically modified.

18. The method for manufacturing a nanocarbon aggregate according to claim 13, wherein said substituent group is added with a metallic compound.

19. A catalyst comprising the nanocarbon aggregate manufactured by the method according to claim 18.

20. The method for manufacturing a nanocarbon aggregate according to claim 13, wherein said substituent group is added with an organic matter or biologic molecule, whereby an additional characteristic including at least one of solvent dispersibility and biographic side wall is provided.

21. A method for manufacturing a nanocarbon aggregate including a petal-shaped graphite aggregate and a nanohorn by $CO_2$ laser ablation, said method comprising:
performing an oxidation treatment on the nanocarbon aggregate obtained after the $CO_2$ laser ablation, to thereby control a content ratio of the petal-shaped graphite aggregate to the nanohorn, wherein a laser power density is changed between 10 and 50 kW/cm$^2$.

22. The method for manufacturing a nanocarbon aggregate according to claim 21, comprising oxidizing an edge of the petal-shaped nanocarbon graphite, and adding a substituent group at least one of a carbonyl group, a carboxyl group and a hydroxyl group.

23. The method for manufacturing a nanocarbon aggregate according to claim 22, wherein oxidization of the edge of the petal-shaped nanocarbon aggregate includes at least one of heating in oxygen ambient, heating in a nitric acid ambient, and a heating in a hydrogen peroxide ambient.

24. The method for manufacturing a nanocarbon aggregate according to claim 22, further comprising oxidizing the nanohorn in the nanocarbon aggregate to form therein an opening, and oxidizing an edge of the opening to add thereto a substituent group including at least one of carbonyl group, carboxyl group and hydroxyl group.

25. The method for manufacturing a nanocarbon aggregate according to claim 24, wherein said oxidization of the nanohorn includes at least one of heating in oxygen, heating in nitric acid, and heating in hydrogen peroxide.

26. The method for manufacturing a nanocarbon aggregate according to claim 22, wherein said substituent group is chemically modified.

27. The method for manufacturing a nanocarbon aggregate according to claim 22, wherein said substituent group is added with a metallic compound.

28. The method for manufacturing a nanocarbon aggregate according to claim 22, wherein said substituent group is added with an organic matter or biologic molecule.

29. A catalyst comprising the nanocarbon aggregate manufactured by the method according to claim 28.

30. A method for manufacturing a nanocarbon aggregate including a petal-shaped aggregate and a nanohorn by $CO_2$ laser ablation, said method comprising:
controlling, in the $CO_2$ laser ablation, a scanning rate of a laser that scans a surface of a graphite target, intensity of the laser, and species and pressure of an ambient gas, to thereby control a content ratio of the petal-shaped graphite aggregate to the nanohorn, wherein
a laser power density is changed between 10 and 50 kW/cm$^2$, and
a rotational speed of the target is controlled between 0.5 rpm and 6 rpm, the petal-containing carbon nanohorn includes one to ten layers of a graphene sheet and has an agglomerated structure of 30 to 200 nm, and the nanohorn has a diameter of 2 to 5 nm.

31. A method for manufacturing a nanocarbon aggregate including a petal-shaped aggregate and a nanohorn by $CO_2$ laser ablation, said method comprising:
performing an oxidation treatment on the nanocarbon aggregate obtained after the $CO_2$ laser ablation, to thereby control a content ratio of the petal-shaped graphite aggregate to the nanohorn, wherein
a laser power density is changed between 10 and 50 kW/cm$^2$, and
a rotational speed of a target is controlled between 0.5 rpm and 6 rpm, the petal-containing carbon nanohorn includes one to ten layers of a graphene sheet and has an agglomerated structure of 30 to 200 nm, and the nanohorn has a diameter of 2 to 5 nm.

* * * * *